(12) United States Patent
Jiang et al.

(10) Patent No.: US 10,978,777 B1
(45) Date of Patent: Apr. 13, 2021

(54) SYSTEMS HAVING WINDOWS WITH PATTERNED COATINGS

(71) Applicant: Apple Inc., Cupertino, CA (US)

(72) Inventors: Yi Jiang, Cupertino, CA (US); Jiangfeng Wu, San Jose, CA (US); Siwen Yong, San Francisco, CA (US); Lijun Zhang, San Jose, CA (US); Mattia Pascolini, San Francisco, CA (US); James R. Wilson, Cupertino, CA (US); Martin Melcher, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 144 days.

(21) Appl. No.: 16/033,010

(22) Filed: Jul. 11, 2018

Related U.S. Application Data

(60) Provisional application No. 62/558,578, filed on Sep. 14, 2017.

(51) Int. Cl.
*H01Q 1/32* (2006.01)
*H01Q 1/12* (2006.01)
*B32B 17/10* (2006.01)

(52) U.S. Cl.
CPC ..... *H01Q 1/1278* (2013.01); *B32B 17/10385* (2013.01); *B32B 17/10642* (2013.01); *B32B 2605/006* (2013.01)

(58) Field of Classification Search
CPC .. H01Q 1/1278; H01Q 1/1271; H01Q 1/1285; B32B 17/10385; B32B 17/10642; B32B 2605/006; B32B 17/10036
See application file for complete search history.

(56) References Cited

U.S. PATENT DOCUMENTS

| | | | |
|---|---|---|---|
| 6,008,767 A | 12/1999 | Taniguchi et al. | |
| 6,261,694 B1 | 7/2001 | Iacovangelo | |
| 6,310,580 B2 | 10/2001 | Taniguchi et al. | |
| 6,534,720 B2 | 3/2003 | Von Alpen et al. | |
| 6,812,901 B2 | 11/2004 | Deininger | |
| 7,403,167 B2 | 7/2008 | Probst et al. | |
| 8,022,333 B2 * | 9/2011 | Maeuser | B32B 17/10761 219/203 |

(Continued)

*Primary Examiner* — Dameon E Levi
*Assistant Examiner* — David E Lotter
(74) *Attorney, Agent, or Firm* — Treyz Law Group, P.C.; G. Victor Treyz; David K. Cole

(57) ABSTRACT

A system such as a vehicle may have windows. A window may have a structural window layer formed from one or more glass layers. A conductive coating such as an infrared-light blocking coating or other optical filter layer may be formed on the window. The conductive coating may include one or more silver layers or other conductive material. Unpatterned portions of the conductive coating are conductive along orthogonal dimensions. A region of the conductive coating may have parallel line-shaped openings that render the coating conductive in only a single dimension while enhancing radio transparency. Another region of the conductive coating may have a two-dimensional pattern of openings such as a mesh-shaped opening formed from intersecting straight and/or curved lines. In this region, the coating is locally rendered insulating and radio-frequency transparent. Antennas and ohmic heating elements may be formed in the coating.

17 Claims, 8 Drawing Sheets

(56) References Cited

U.S. PATENT DOCUMENTS

| | | | |
|---|---|---|---|
| 2003/0034927 A1* | 2/2003 | Deininger | H01Q 1/1271 |
| | | | 343/713 |
| 2004/0200821 A1 | 10/2004 | Voeltzel | |
| 2006/0152421 A1* | 7/2006 | Baranski | B32B 17/10036 |
| | | | 343/713 |
| 2010/0266832 A1* | 10/2010 | Derda | B32B 17/10 |
| | | | 428/292.1 |
| 2012/0317903 A1 | 12/2012 | Kuwano et al. | |
| 2017/0317399 A1* | 11/2017 | Droste | H05B 3/84 |

\* cited by examiner

SYSTEMS HAVING WINDOWS WITH PATTERNED COATINGS

This patent application claims the benefit of provisional patent application No. 62/558,578, filed on Sep. 14, 2017, which is hereby incorporated by reference herein in its entirety.

FIELD

This relates generally to windows, and, more particularly, to coated windows.

BACKGROUND

Windows such as vehicle windows are formed from glass. To provide desired functions such as defogging and wireless communications, conductive structures such as metal wires and films are sometimes incorporated into windows. These structures can be unsightly or can block radio-frequency signals associated with wireless devices being operated in the interior of a vehicle.

SUMMARY

A system such as a vehicle may have windows. A window may have a structural portion formed from one or more transparent structural layers. The structural layers may be formed from glass. In windows with multiple glass layers, the glass layers may be laminated together with a layer of polymer.

A conductive coating may be formed on the window. The conductive coating may include one or more silver layers or one or more layers of other conductive material. The conductive coating may form an infrared-light-blocking filter or other optical filter and/or may form a low-emissivity layer that blocks heat.

Unpatterned portions of the conductive coating have low sheet resistance and are conductive in multiple orthogonal dimensions (e.g., horizontally and vertically). A region of the conductive coating may have parallel line-shaped openings (insulating lines) that render the coating conductive in only a single dimension while enhancing radio transparency. Another region of the conductive coating may have a two-dimensional pattern of openings such as a rectangular grid of openings formed from intersecting horizontal and vertical insulating lines or an insulating grid formed from openings of other shapes (circular, hexagonal, triangular, etc.). In this region, the coating is locally rendered insulating and radio-frequency transparent. Antennas and ohmic heating elements may be formed in the coating.

DETAILED DESCRIPTION

A system may have windows that include components formed from a patterned conductive layer. The patterned conductive layer may be a layer associated with blocking near infrared light and/or blocking heat or any other suitable conductive window layer. The components formed from the patterned conductive layer may include antennas and may include ohmic heaters for defogging the windows. The system may be a building, a vehicle, or other suitable system. Illustrative configurations in which the system with the windows is a vehicle may sometimes be described herein as an example. This is merely illustrative. Window structures with patterned conductive layers may be formed in any suitable system.

Figure 1:
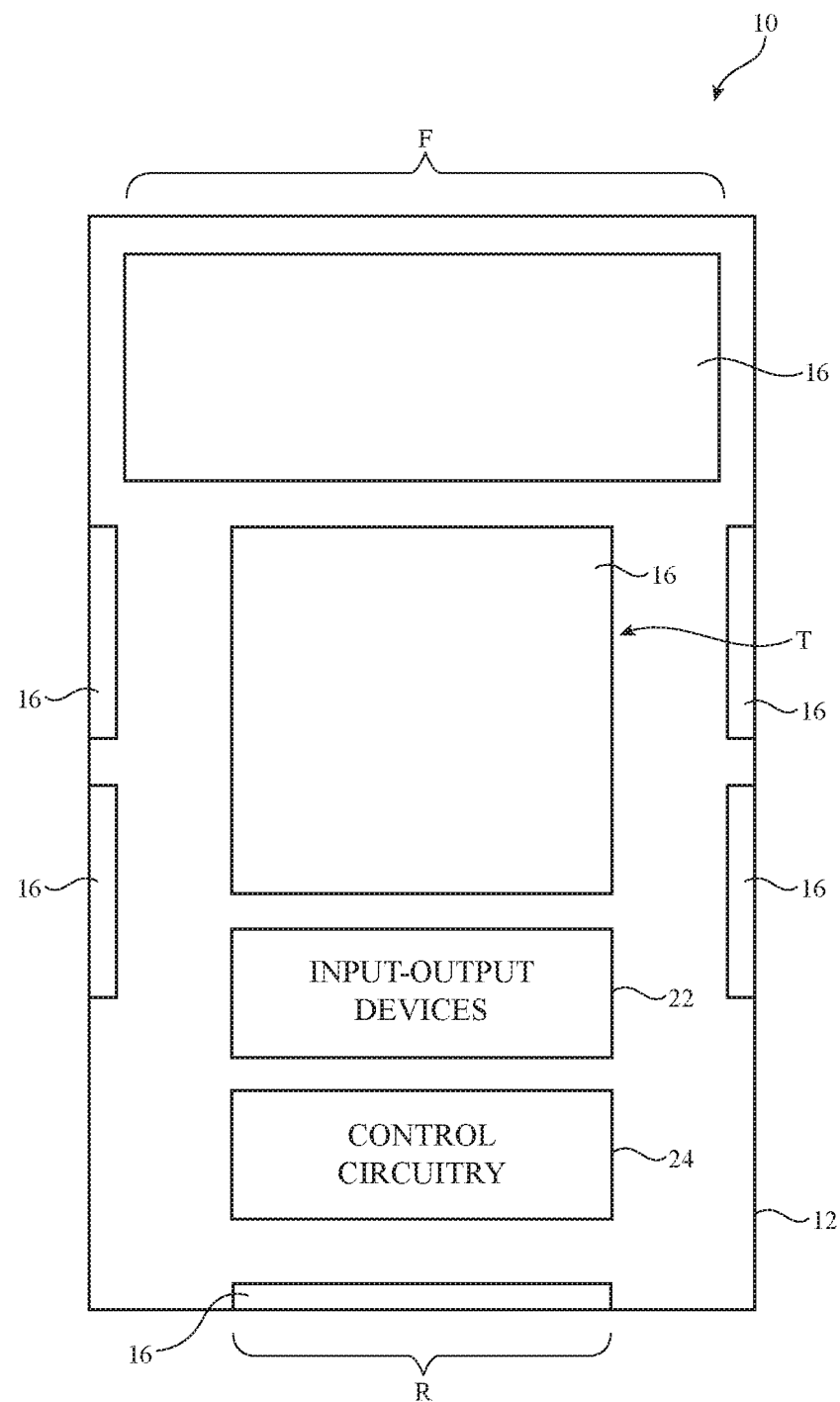
FIG. 1 is a schematic diagram of an illustrative system in accordance with an embodiment.

An illustrative system of the type that may include windows with a patterned conductive layer is shown in FIG. 1. As shown in FIG. 1, system 10 may be a vehicle having a body such as body 12 with a chassis to which wheels are mounted, propulsion and steering systems, and other vehicle systems. Body 12 may include doors, trunk structures, a hood, side body panels, a roof, and/or other body structures. Seats may be formed in the interior of body 12. Vehicle 10 may include windows such as window(s) 16. Window 16 and portions of body 12 may separate the interior of vehicle 10 from the exterior environment that is surrounding vehicle 10.

Windows 16 may include a front window 16 on front F of vehicle 10, a moon roof (sun roof) window 16 or other window extending over some or all of top T of vehicle 10, a rear window 16 on rear R of vehicle 10, and side windows on the sides of vehicle 10 between front F and rear R.

Figure 2:
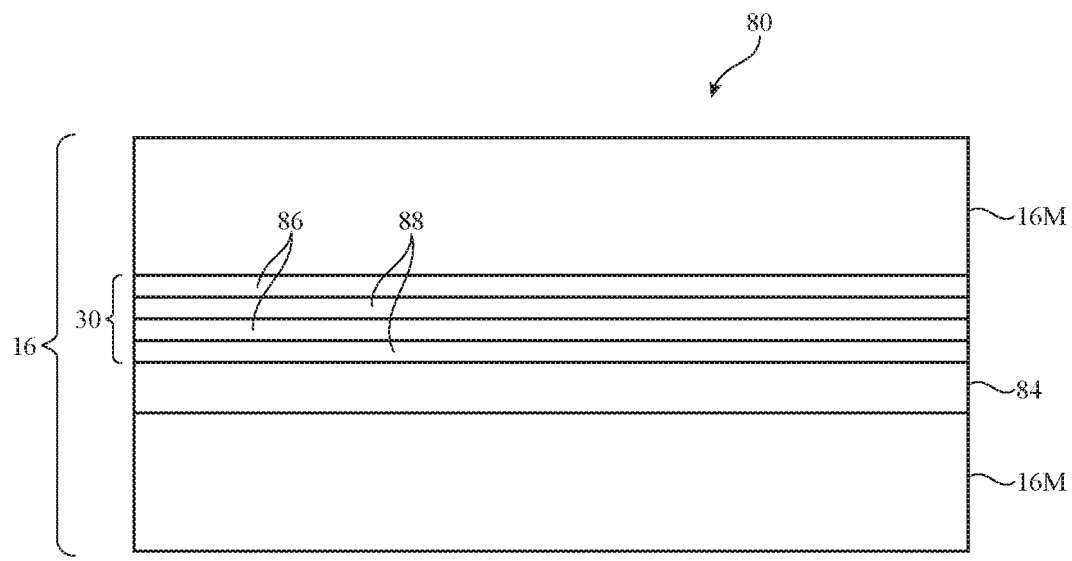
FIG. 2 is a cross-sectional side view of an illustrative window with a conductive layer for the system of FIG. 1 in accordance with an embodiment.

An illustrative configuration for a window such as one of windows 16 of FIG. 1 is shown in FIG. 2. Window 16 may one or more structural layers. In some arrangements, window 16 may include only a single structural layer (e.g., a layer of glass having a thickness of 3-6 mm or other suitable thickness for providing window 16 with sufficient structural support to allow window 16 to be used in a vehicle). In the example of FIG. 2, window 16 includes two structural window layers 16M, one of which faces window exterior 80 and one of which faces window interior 82. Layers 16M may be formed from transparent glass, transparent plastic, or other structural window materials. These layers may be strengthened (e.g., by annealing, tempering, and/or chemical strengthening). Each of layers 16M may be, for example, 1.6 to 3.2 mm thick, at least 1.5 mm thick, less than 4 mm thick, or other suitable thickness.

Layers 16M may be laminated to each other using polymer layer 84 (e.g., to form a laminated window). Polymer layer 84 may be, for example, a polymer such as polyvinyl butyral (PVB) or ethylene-vinyl acetate (EVA). Polymer layer 84 may have a thickness of 0.76 mm or other suitable thickness (e.g., greater than or less than 0.76 mm). If desired, a thinner polymer layer (e.g., a layer of 0.38 mm) may be used in a configuration of the type in which window 16 includes a stiff interlayer (e.g., a polyethylene terephthalate layer). In general, any suitable thickness may be used for layer 30 (e.g., at least 0.3 mm, less than 0.8 mm, etc.)

As shown in FIG. 2, window 16 may include a coating layer such as coating layer 30. Coating layer 30 may include one or more sublayers and may be used to provide infrared-light blocking, low-emissivity (heat-blocking), and/or other desired properties to window 16. As an example, layer 30 may be an infrared-light blocking layer and/or low-emissivity layer having one or more silver layers 86 and one or more metal oxide layers (e.g., tin oxide, zinc oxide, etc.), other inorganic dielectric layers (e.g., silicon oxide, silicon nitride, etc.) or other dielectric layers 88. Layer 30 may be configured to serve as a low-emissivity ("low-e") layer that blocks heat and/or may serve as an optical filter layer that reduces infrared light transmission (e.g., layer 30 may reduce transmission of solar infrared light at wavelengths of about 0.7 microns to 2.5 microns to less than 50%, less than 10%, etc. while transmitting visible light (e.g., transmitting at least 70% of visible light or at least transmitting more visible light than infrared light, etc.). Coating layer 30 may include one silver layer, two silver layers, three silver layers (triple silver), four layers of silver (quad silver), or other suitable infrared-light-blocking coating materials. By blocking infrared light, vehicle occupant comfort may be enhanced. If desired, other types of optical filter layer may be formed from coating layer 30 (e.g., tinting, neutral density filtering, etc.). Coatings such as coating layer 30 may be formed on the inner surface of the outer glass layer 16M and/or other surfaces of layer(s) 16M. Because coating layer 30 includes one or more conductive material layers (e.g., one or more silver layers 86), coating layer 30 may sometimes be referred to as a conductive coating layer, conductive coating, or conductive layer.

Figure 3:
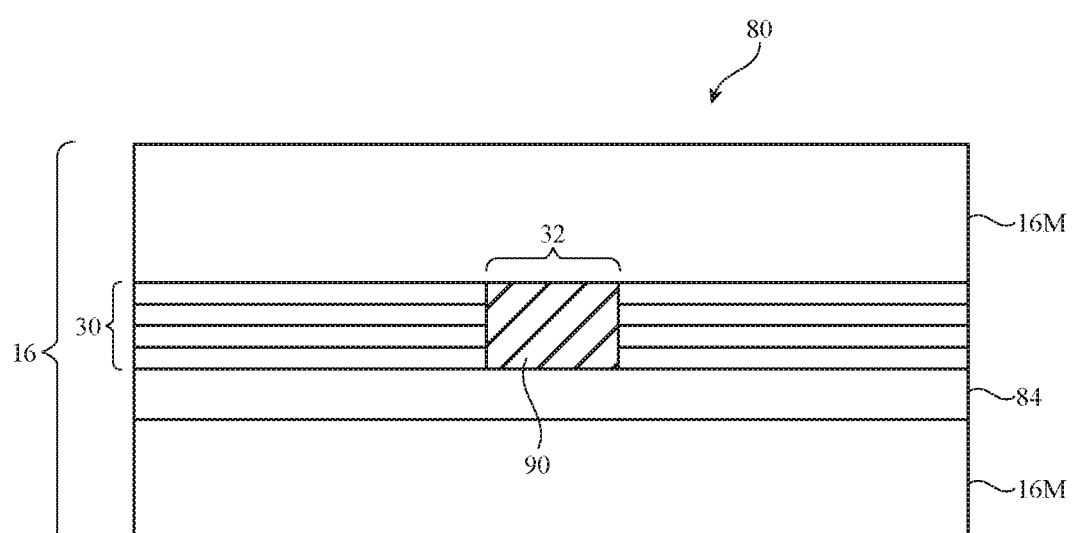
FIG. 3 is a cross-sectional side view of the illustrative window of FIG. 2 in which a opening has been formed in the window in accordance with an embodiment.

Laser patterning, lift-off techniques, and/or other conductive layer patterning techniques may be used in forming a pattern of openings in layer 30. As shown in FIG. 3, for example, openings such as opening 32 may be formed in layer 30. Opening 32 does not contain conductive material and is therefore insulating. Opening 32 may be filled with a dielectric such as air or may, if desired, be filled with a solid dielectric such as dielectric 90 (e.g., transparent polymer or other inorganic and/or organic dielectric). The incorporation of polymer 90 or other transparent material into opening 32 may visually blend opening 32 with surrounding window structures. In this way, a pattern of openings 32 (e.g., parallel lines, grid-shaped lines, etc.) may be unnoticeable to a viewer.

Different regions of conductive layer 30 may be provided with openings 32 of different patterns. Consider, as an example, the illustrative portion of window 16 of FIG. 4. In this example, window 16 lies in the X-Y plane.

In region 16A, conductive layer 30 is unpatterned (free of openings 32) and is therefore conductive along both the X and Y dimensions.

In region 16B, conductive layer 30 has a set of parallel line-shaped openings 32. These openings may be, for example, about 10-30 microns in width, at least 5 microns in width, less than 40 microns in width, less than 30 microns in width, less than 20 microns in width, or other suitable size. The use of small dimensions for openings 32 may help prevent openings 32 from being visible to a viewer. The opening 32 in region 16B form insulating (electrically isolating) lines that run parallel to the X dimension. The insulating lines formed by openings 32 in region 16B may be spaced apart by a distance of about 0.1-10 mm, at least 0.5 mm, at least 0.7 mm, less than 5 mm, less than 2.5 mm, less than 1.2 mm, or other suitable spacing. Due to the presence of horizontal insulating lines 32 in region 16B, coating 30 is conductive along a single dimension. In particular, coating 30 in region 16B is conductive along dimension X (current can be conducted horizontally), but is electrically insulating (and therefore exhibits a high resistivity and low conductivity) along the Y dimension. The insulating nature of region 16B in the Y dimension may enhance radio-frequency transparency of window 16 (e.g., light that is polarized parallel to the Y dimension may pass through region 16B without being significantly attenuated). This allows cellular telephones, computers with wireless communications circuitry, and other wireless electronic devices in the interior of a vehicle or other system to be used to transmit and receive wireless signals.

Figure 4:
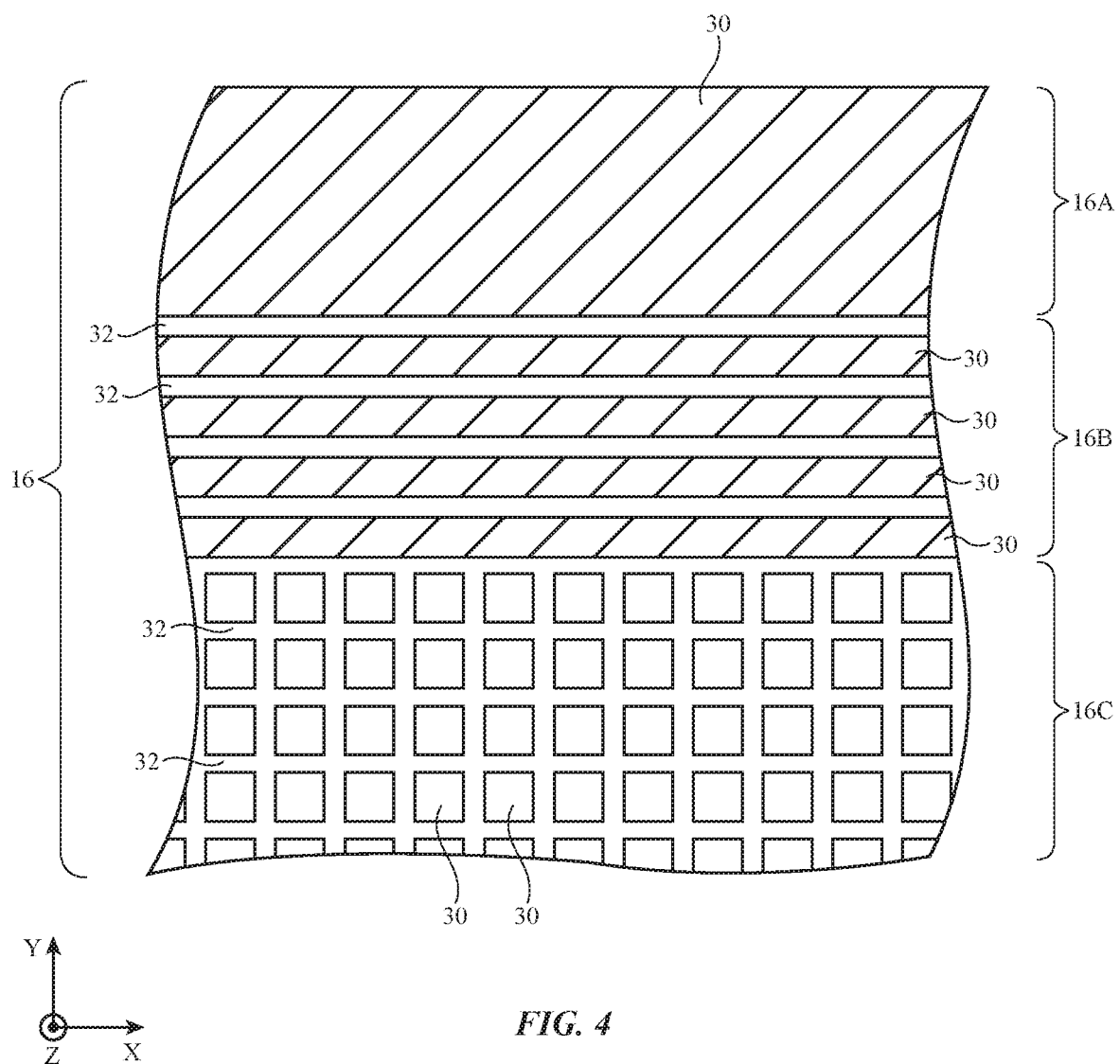
FIG. 4 is a top view of a window with conductive layer regions having different illustrative patterns of openings in accordance with an embodiment.

In region 16C, conductive layer 30 has openings 32 formed in a two-dimensional pattern that prevents current from flowing either horizontally (in the X dimension) or vertically (in the Y dimension). In the example of FIG. 4, openings 32 have a grid-shaped pattern formed from intersecting horizontal and vertical insulating lines, but other patterns of openings may be formed to restrict current flow in both horizontal and vertical dimensions, if desired. Due to the patterning of openings 32 in conductive layer 30 in region 16C, region 16C is rendered insulating (e.g., the portion of conductive layer 30 in region 16C is no longer macroscopically conductive). The insulating portion of coating layer 30 that is formed in region 16C will exhibit radio transparency. For example, region 16C will be radio transparent to radio-frequency signals polarized along either the X or Y dimension. Radio-frequency signals for an electronic device in the interior of system 10 can be received through region 16C and radio-frequency signals being transmitted by an electronic device in the interior of system 10 may pass through region 16C to the exterior of system 10. Patterning a portion of coating 30 using a two-dimensional grid pattern or other pattern of the type shown in region 16C of FIG. 4 will therefore selectively render that portion of coating 30 insulating (e.g., resistivity and sheet resistance in two orthogonal horizontal dimensions will be high and conductivity will be low).

By patterning conductive layer 30 to contain regions 16A, 16B, and/or 16C of desired shapes, conductive layer 30 may be configured to form regions that are suitable for forming thin-film ohmic heating elements and that are suitable for forming antennas. Ohmic heating elements may be used to form defogging heaters in one or more portions of window 16. Antennas can be used to transmit and/or receive wireless signals.

Figure 5:
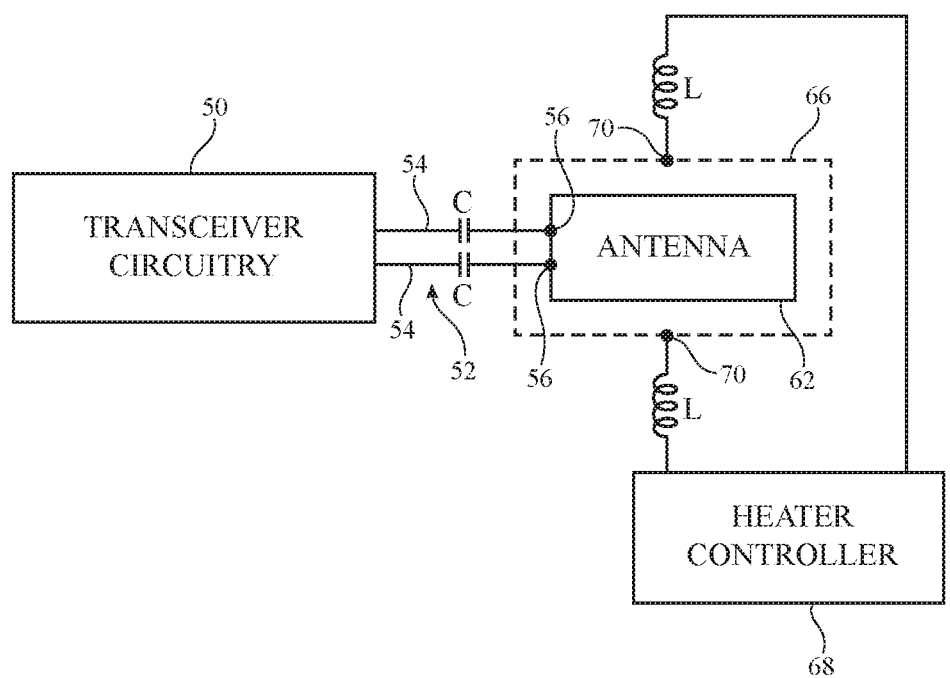
FIG. 5 is a diagram of illustrative circuitry for use in adjusting components formed from a patterned conductive window layer in accordance with an embodiment.

FIG. 5 is a circuit diagram of illustrative circuitry that may be used in system 10 to form a heater and a wireless communications circuit. As shown in FIG. 5, coating 30 may be patterned to form one or more antennas such as antenna 62. Coating 30 may also be patterned to form ohmic heating elements such as ohmic heating element 66. The portions of conductive coating 30 that are used in forming heating element 66 may be shared with the portions of conductive coating 30 that are used in forming antenna 62 and/or may be partially or fully separate from the portions of conductive coating 30 that are used in forming antenna 62.

Radio-frequency transceiver circuitry 50 may be coupled to antenna 62 using transmission line structures such as transmission line 52. Transmission line 52 may have positive and ground signal lines 54 coupled to respective antenna feed terminals 56 of antenna 62. If desired, impedance matching circuitry and/or antenna tuning circuitry may be incorporated into antenna 62 and/or interposed into transmission line 52 to adjust the performance of antenna 62. Capacitors C may, if desired, form high-pass filters that are used to block low-frequency noise (e.g., by preventing direct-current signals at 0 Hz and other low-frequency signals from passing between antenna 62 and transceiver circuitry 50) while allowing radio-frequency signals from transceiver circuitry 50 to be transmitted to antenna 62 and to be received from antenna 62. Transceiver circuitry 50 may include wireless local area network transceiver circuitry operating at 2.4-5 GHz, may include cellular telephone circuitry operating at 700 MHz-2700 MHz, less than 700 MHz, more than 2700 MHz, and/or other suitable cellular telephone frequencies, may include satellite navigation system circuitry operating at 1575 MHz and/or other satellite navigation system frequencies, and/or may include other wireless circuitry (e.g., near-field communications circuitry, millimeter wave circuitry, circuitry operating in bands below 700 MHz, circuitry operating in bands above 2700 MHz, etc.). Transceiver circuitry 50 may include radio receiver circuitry (e.g., amplitude modulation radio circuitry, frequency modulation radio circuitry, satellite radio circuitry, etc.), may include television receiver circuitry for receiving terrestrial and/or satellite television broadcasts, and/or may include other wireless transceiver circuitry. Heater controller 68 may include circuitry for producing signals that are applied to a thin-film heating element 66 formed from patterned coating layer 30. Inductors L may be interposed between heater controller 68 and heating element terminals 70. Inductors L may form low-pass filters that allow low-frequency signals from heating controller 68 (e.g., direct-current signals, low-frequency pulse-width-modulated signals or other pulsed signals such as signals at 1-10 Hz, at least 1 Hz, less than 100 Hz, or other low frequencies, etc.) to be applied to heating element 66 while blocking radio-frequency signals that have been coupled into element 66 from transceiver circuitry 50.

Figure 6:
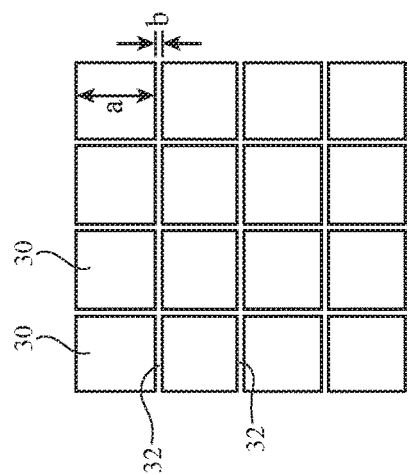
FIGS. 6, 7, 8, 9, 10, and 11 are top views of windows showing illustrative conductive window layer opening patterns in accordance with embodiments.
Figure 7:
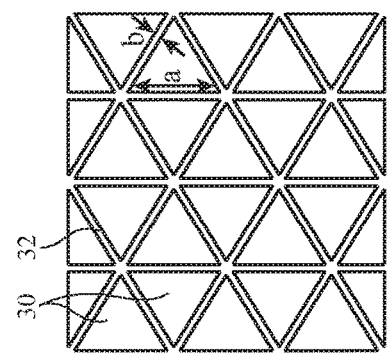
Figure 8:
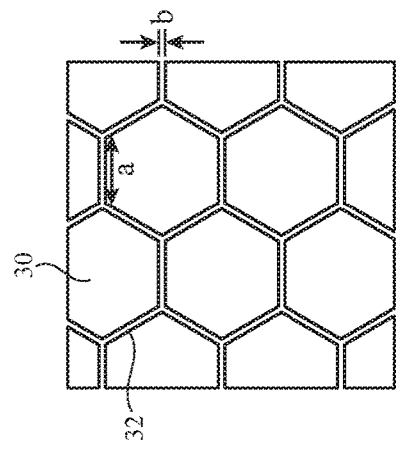
Figure 9:
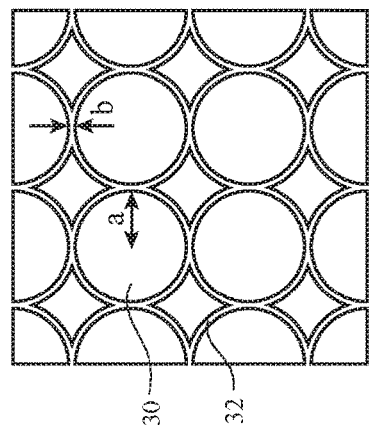
Figure 10:
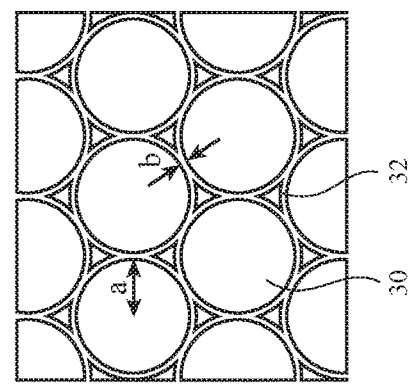
Figure 11:
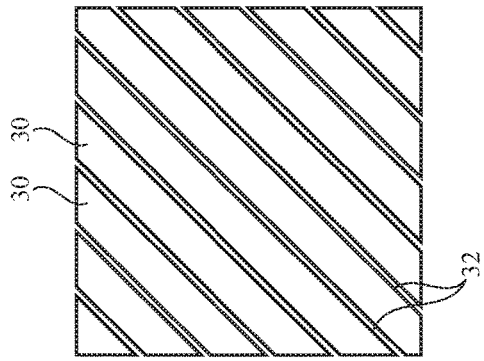

FIGS. 6, 7, 8, 9, 10, and 11 are top views of portions of coating layer 30 that have been patterned using different illustrative patterns of openings 32. In FIG. 6, openings 32 form a grid of vertical and horizontal lines. In FIG. 7, openings 32 form a grid that divides layer 30 into triangular islands. In FIG. 8, openings 32 have the shape of hexagons. Circular openings 32 of FIG. 9 are arranged in a rectangular array. Circular openings 32 of FIG. 10 are arranged in an array in which alternating rows of circles are offset from each other. The linewidth b of the grid-shaped openings 32 of FIGS. 6, 7, 8, 9, and 10 may be about 1-100 microns, 10-30 microns, at least 5 microns, less than 40 microns, less than 30 microns, less than 20 microns, less than 100 microns, or other suitable size to help visually hide openings 32. The resulting characteristic lateral dimension a of the islands of conductive material 30 that are produced by forming openings 32 may be about 0.1-10 mm, at least 0.5 mm, at least 0.7 mm, less than 5 mm, less than 2 mm, less than 1.2 mm, or other suitable size. Different sizes for parameters a and b may be selected depending on the operating frequency of radio-frequency transceiver 50. As an example, if transceiver 50 operates in a 5 GHz communications band, a may be 1 mm and b may be 20 microns.

The two-dimensional patterning of openings 32 in these illustrative patterns serves to form an electrically insulating and radio-transparent region 16C in coating 30, as described in connection with FIG. 4. If desired, parallel insulating lines (see, e.g., openings 32 of FIG. 11) may be formed in coating 30 (e.g., to form a region that is electrically conductive in one lateral dimension but not the other and that is radio-transparent for signals with at least one linear polarization). Line-shaped openings may be oriented horizontally, vertical, diagonally, etc. In some arrangements, different areas of window 16 may have lines with different orientations (e.g., vertical lines in one section of window 16 and horizontal lines in another section of window 16 to ensure that window 16 has regions that are radio-transparent to radio-frequency signals with different polarizations). When lines 32 run horizontally, coating 30 is rendered insulating in the vertical direction and may pass radio-frequency signals that are linearly polarized vertically. When lines 32 run vertically, coating 30 is rendered insulating in the horizontal direction and may be transparent to radio-frequency signals that are linearly polarized along the horizontal dimension (while blocking vertically polarized signals). In some arrangements, diagonal lines 32 may partially block and may partially transmit both horizontally polarized and vertically polarized signals.

Figure 12:
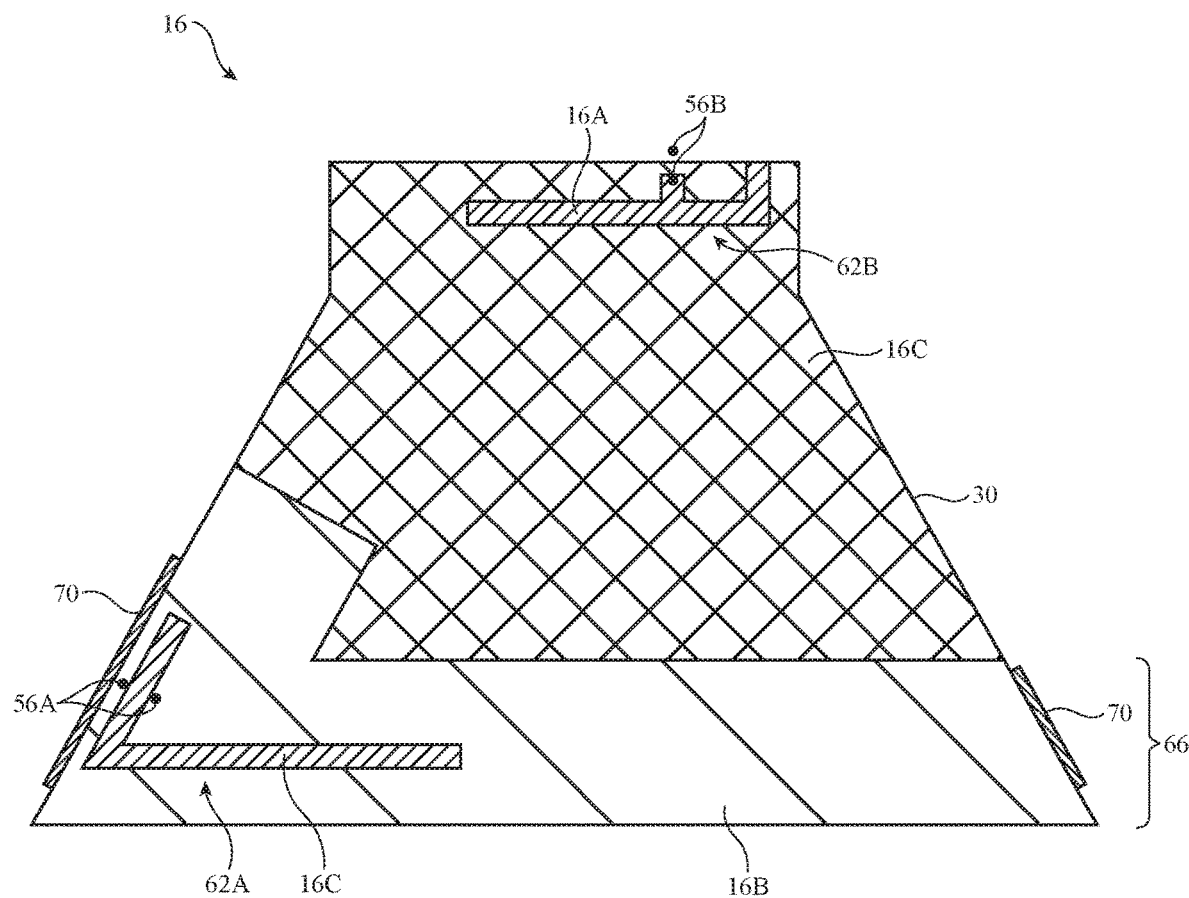
FIG. 12 is a diagram of an illustrative window in accordance with an embodiment.

FIG. 12 is a diagram of an illustrative window containing a patterned conductive coating that forms two antennas (slot antenna 62A and inverted-F antenna 62B) and that forms a thin-film ohmic heating element such as heating element 66. Heating element 66 may be formed from a region of coating 30 that has been patterned using the pattern of region 16B of FIG. 4 (or, if desired, a portion of a region without openings such as region 16A). When heating element 66 is formed in region 16B, current applied to heating element 66 by heater controller 68 using heater terminals 70 is allowed to flow horizontally and heats heating element 66 by ohmic heating. Because region 16B is at least partially conductive, coating 30 in region 16B may also serve as a ground plane for radio-frequency antenna signals. The ground plane may be provided with an insulating region 16C by patterning coating layer 30 within a slot-shaped portion of region 16B, as shown in FIG. 12. The slot-shaped insulating region 16C in the ground plane formed from region 16B can be used in forming slot antenna 62A. Antenna feed terminals 56A may be used in feeding antenna 62A. Inverted-F antenna 62B, which may be fed using antenna feed terminals 56B, may be formed by patterning an F-shaped inverted-F resonating element from coating 30 (e.g., by forming an unpatterned region 16A of coating 30 within a surrounding insulating region 16C of coating 30). If desired, other antenna types may be formed (e.g., other planar antennas such as monopoles, dipoles, loop antennas, patch antennas, bowtie antennas, etc.). The illustrative slot and inverted-F antennas of FIG. 12 are merely illustrative.

Figure 13:
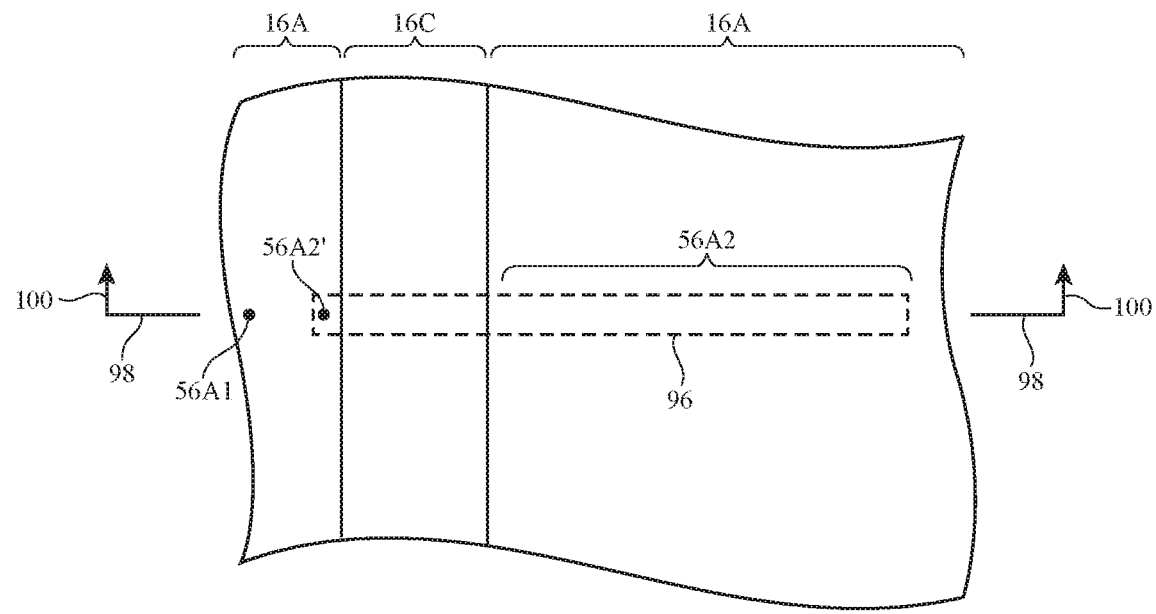
FIG. 13 is a top view of an illustrative antenna feed arrangement for a slot antenna in accordance with an embodiment.
Figure 14:
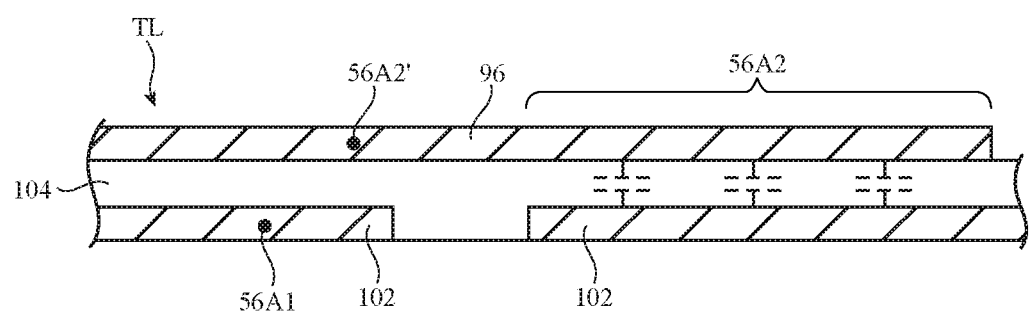
FIG. 14 is a cross-sectional side view of the illustrative antenna feed structure of FIG. 13 in accordance with an embodiment.

FIG. 13 is a top view of the feed portion of illustrative slot antenna 62A of FIG. 12. In the example of FIG. 13, feed terminal 56A1 is coupled to a portion of the ground plane (formed from conductive area 16A of coating 30. Antenna 62A is feed on an opposing side of the antenna slot formed from insulating region 16C by an overlapping portion of conductive strip 96 forming antenna feed terminal 56A2. Transmission line conductors (see, e.g., lines 54 of FIG. 5) may be coupled to feed terminal locations 56A1 and 56A2' of FIG. 13 (as an example). A cross-sectional side view of the portion of antenna 62A shown in FIG. 13 is shown in FIG. 14. Layers 96 and 102 may be silver layers 88 of FIG. 2 or other conductive sublayers in coating 30 or other coatings on window 16. In region TL, a portion of layer 96 may form a first transmission line conductor 54 and a portion of layer 102 may form a second transmission line conductor 54. Dielectric 104 (see, e.g., dielectric layers 88 of FIG. 2) may separate conductors 54. Feed terminal 56A1 may be coupled to the second transmission line conductor. Feed terminal portion 56A2' may be coupled to the first transmission line conductor. In region 56A2, a strip-shaped portion of layer 96, which is coupled to terminal portion 56A2', may be capacitively coupled to an overlapped portion of conductive layer 102 (which has been patterned to form a conductive ground plane region 16B) and may therefore form a feed terminal for antenna 62A.

Figure 15:
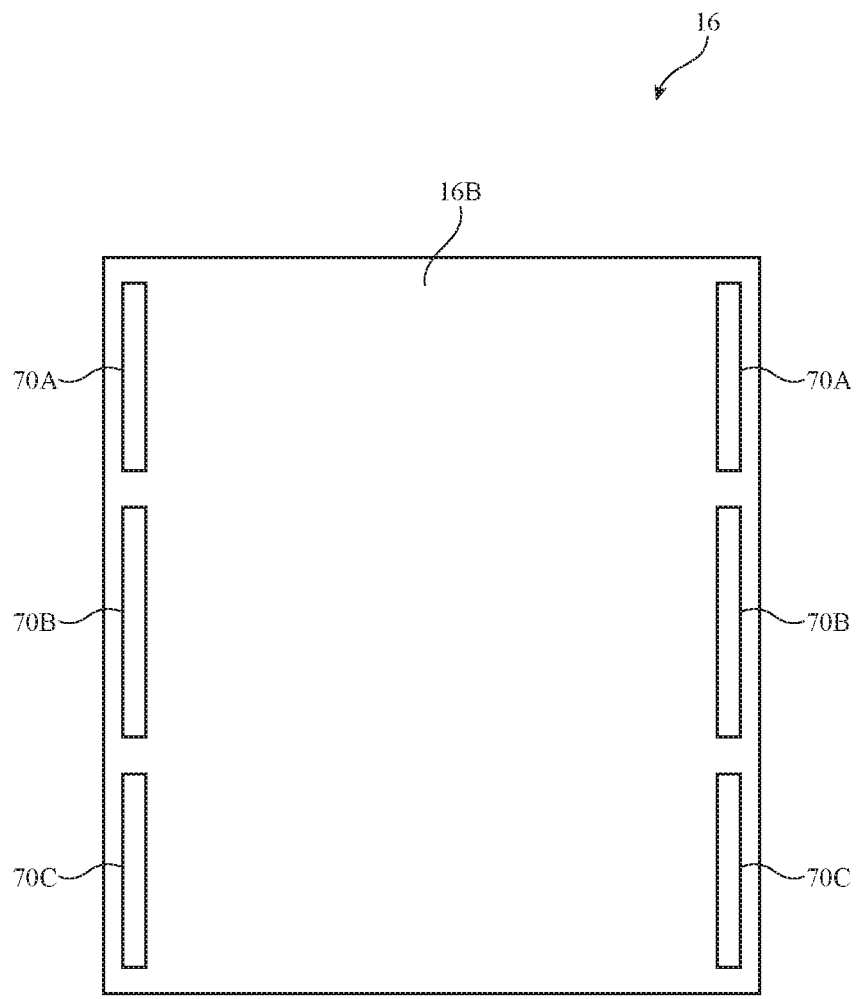
FIG. 15 is a top view of an illustrative window with multiple independently adjustable heater regions in accordance with an embodiment.

If desired, regions of coating 30 such as multiple areas of region 16B may be provided with separate sets of heater terminals. As shown in FIG. 15, for example, region 16B may have a first set of heater terminals 70A, a second set of heater terminals 70B, and a third set of heater terminals 70C. Each pair of heater terminals in this example can be individually adjusted using a respective heater controller (see, e.g., heater controller 68 of FIG. 5, allowing different areas of window 16 to be selectively defogged.). To allow current to flow between the first and second terminals in each pair of terminals, line-shaped openings 32 in coating layer 30 of region 16B of FIG. 15 may run horizontally.

The foregoing is merely illustrative and various modifications can be made to the described embodiments. The foregoing embodiments may be implemented individually or in any combination.

What is claimed is:

1. A window, comprising:
   a structural transparent window layer;
   a conductive coating layer on the structural transparent window layer, wherein the conductive coating layer includes first and second regions configured to allow current to flow and a third region configured to block current flow;
   an antenna formed from the conductive coating layer; and
   an ohmic heating element formed from the conductive coating layer.

2. The window defined in claim 1 wherein the structural transparent window layer comprises a glass layer, wherein the conductive coating layer is formed on a surface of the glass layer, wherein the first region is configured to allow current to flow along two orthogonal dimensions, wherein the second region is configured to allow current to flow along a single dimension, and wherein the ohmic heating element includes a portion of the coating layer in the second region.

3. The window defined in claim 2 wherein the antenna incudes an antenna resonating element formed from a portion of the coating layer in the first region.

4. The window defined in claim 3 wherein the antenna resonating element comprises a planar antenna resonating element.

5. The window defined in claim 2 wherein the conductive coating forms a ground plane, wherein the third region forms a slot in the ground plane, and wherein the antenna is formed from the ground plane and the slot.

6. The window defined in claim 2 wherein the first region is free of openings in the conductive coating layer.

7. The window defined in claim 2 wherein the second region has multiple parallel line-shaped openings in the conductive coating layer.

8. The window defined in claim 3 wherein the third region has openings that extend in two dimensions and that block horizontal and vertical current flow.

9. The window defined in claim 1 wherein the conductive coating comprises at least one metal layer.

10. The window defined in claim 1 wherein the conductive coating includes at least first and second silver layers configured to block infrared light.

11. A vehicle, comprising:
    a vehicle body;
    a radio-frequency transmitter;
    a heating controller;
    a glass window layer coupled to the vehicle body; and
    a conductive coating on the glass window layer configured to form an ohmic heating element coupled to the heating control and an antenna coupled to the radio-frequency transmitter, wherein the conductive coating has openings that form a grid that blocks current flow and creates a radio-transparent region in the conductive coating.

12. The vehicle defined in claim 11 further comprising:
    low-pass filter circuitry coupled between the heating controller and the ohmic coating layer; and
    high-pass filter circuitry coupled between the radio-frequency transmitter and the conductive coating.

13. The vehicle defined in claim 12 wherein the low-pass filter circuitry comprises inductors, wherein the high-pass filter circuitry comprises capacitors, and wherein the coating layer has at least one region that forms part of the ohmic heating element and that forms part of the antenna.

14. The vehicle defined in claim 11 wherein the conductive coating comprises at least one layer of silver with openings.

15. The vehicle defined in claim 14 wherein the openings are configured to form insulating lines.

16. The vehicle defined in claim 15 further comprising transparent dielectric in the openings.

17. The vehicle defined in claim 11 wherein the conductive coating has first and second metal layers, wherein the first layer forms a ground for the antenna, wherein the antenna includes a slot in the ground, and wherein a portion of the second metal layer forms a feed conductor that is capacitively coupled to a portion of the ground.

* * * * *